(12) United States Patent
Weiss et al.

(10) Patent No.: US 6,738,951 B1
(45) Date of Patent: May 18, 2004

(54) TRANSCODING SYSTEM FOR DELIVERING ELECTRONIC DOCUMENTS TO A DEVICE HAVING A BRAILLE DISPLAY

(75) Inventors: Lawrence F. Weiss, Round Rock, TX (US); Richard S. Schwerdtfeger, Round Rock, TX (US); Rabindranath Dutta, Austin, TX (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/458,647

(22) Filed: Dec. 9, 1999

(51) Int. Cl.[7] .............................................. G06F 15/00
(52) U.S. Cl. ...................................... 715/523; 715/513
(58) Field of Search ............................ 715/513, 501.1, 715/523; 704/271

(56) References Cited

U.S. PATENT DOCUMENTS

| | | | | |
|---|---|---|---|---|
| 5,537,526 A | * | 7/1996 | Anderson et al. ............ | 715/515 |
| 5,748,186 A | * | 5/1998 | Raman ..................... | 715/500.1 |
| 5,754,173 A | * | 5/1998 | Hiura et al. ................ | 345/744 |
| 5,893,109 A | | 4/1999 | DeRose et al. | |
| 5,918,013 A | * | 6/1999 | Mighdoll et al. ........... | 709/217 |
| 5,987,256 A | * | 11/1999 | Wu et al. ................... | 717/146 |
| 5,996,022 A | * | 11/1999 | Krueger et al. ............. | 709/247 |
| 6,115,482 A | * | 9/2000 | Sears et al. ................. | 382/114 |
| 6,161,126 A | * | 12/2000 | Wies et al. .................. | 709/203 |
| 6,311,215 B1 | * | 10/2001 | Bakshi et al. ............... | 709/221 |
| 6,401,132 B1 | * | 6/2002 | Bellwood et al. ........... | 709/246 |
| 6,405,240 B1 | * | 6/2002 | Tsubone et al. ............. | 709/203 |
| 6,421,733 B1 | * | 7/2002 | Tso et al. .................... | 709/246 |
| 6,510,469 B1 | * | 1/2003 | Starnes et al. .............. | 709/247 |
| 6,535,896 B2 | * | 3/2003 | Britton et al. ............... | 715/523 |
| 6,647,364 B1 | * | 11/2003 | Yumura et al. ................ | 704/4 |

OTHER PUBLICATIONS

Mazzocchi, EXtensible Server Pages (XSP) Layer 1, Jun. 11,1999 http://xml.coverpages.org/WD–xsp–19990611.html.*

Hadjadj et al., "Making the Internet Accessible to the Visually Handicapped," RESNA '98, Jun. 1998, pp. 269–271.

Kieninger et al., "Hyperbraille—A Hypertext System for the Blind," ASSETS '94, Oct. 1994, pp. 92–99.

* cited by examiner

*Primary Examiner*—Joseph H. Feild
*Assistant Examiner*—Adam Queler
(74) *Attorney, Agent, or Firm*—Kevin L. Daffer; Conley Rose P.C.; Marilyn S. Dawkins

(57) ABSTRACT

An electronic document delivery system is described including a client machine coupled to (i.e., in wired or wireless communication with) a transcoder proxy. The client machine may be, for example, a palmtop or handheld computer or a wireless communication device with limited memory and/or processing capability. The client machine includes a Braille display and provides Braille format information identifying a selected Braille format to the transcoder proxy. The transcoder proxy is coupled to receive the Braille format information and electronic documents. Each electronic document includes presentation information (e.g., text and/or user controls such as buttons). The transcoder proxy includes a rule set including rules for translating electronic documents from any one of a set of first digital formats (e.g., a text-based markup language such as HTML, extensible markup language/XML, POSTSCRIPT, or portable document format/PDF) to any one of various Braille formats (e.g., English Braille, European Braille, Japanese Braille, and/or grades such as grade 1, grade 2, etc.). Locating the rule set within the transcoder proxy reduces the resource requirements of the client machine. The transcoder proxy translates the electronic document from the first digital format to a second digital format (e.g., a scripting language) such that the presentation information is converted to the selected Braille format, and provides the electronic document to the client machine in the second digital format.

18 Claims, 3 Drawing Sheets

TRANSCODING SYSTEM FOR DELIVERING ELECTRONIC DOCUMENTS TO A DEVICE HAVING A BRAILLE DISPLAY

BACKGROUND OF THE INVENTION

1. Field of the Invention

This invention relates to systems for providing electronic documents, and more particularly to document delivery systems wherein servers transcode documents delivered to client machines.

2. Description of Related Art

The World Wide Web, known simply as the "Web", is a network of Internet servers that provide specially formatted electronic documents to various "client" machines. Web servers currently support documents formatted in a text-based markup language called hypertext markup language (HTML).

In order to provide Web access to client machines with limited capabilities (e.g., palmtop or handheld computers), a "transcoder proxy" is typically positioned between the client machine and an Internet server. The transcoder proxy may, for example, provide selected portions of a requested Web document to the client machine based upon the capabilities of client machine. In doing so, the transcoder proxy may translate one or more selected portions of the Web document from one digital format to another.

FIG. 1 is a block diagram of a representative system 10 currently used to provide an electronic document 12 (e.g., a Web page) to a client machine 14 with limited capabilities. Client machine 14 may be, for example, a palmtop or handheld computer with limited memory, processing capability, and/or display capability. System 10 includes an internet server 16, and a transcoder proxy 18 interposed between client machine 14 and internet server 16. Transcoder proxy 18 forwards a request for document 12 from client machine 14 to internet server 16. Such a request typically includes a uniform resource locator (URL) of document 12 specifying the internet protocol (IP) address of document 12 and the name of the file containing document 12.

Internet server 16 fetches document 12 and provides document 12 to transcoder proxy 18. Based upon the capabilities of client machine 14, transcoder proxy 18 may translate or "transcode" one or more selected portions of document 12 from one digital format to another. For example, transcoder proxy 18 may transcode a portion of document 12 from HTML to a script written in a scripting language understood by a Web browser application program running within client machine 14. The Web browser program may use information conveyed by the script to display the one or more selected portions of document 12 upon a display device of client machine 14.

Alternately, client machine 14 may include a text-to-speech converter, and the information conveyed by the script may be used to output the one or more selected portions of document 12 as speech through a speaker of client machine 14. The term "assistive technology" is used herein to describe technology that helps physically challenged individuals access to a computer system (e.g., client machine 14). Well known types of assistive technologies include "screen readers" which convert display information to speech, "screen magnifiers" which enlarge features of portions of display screen contents, and voice recognition software which converts speech to a digital representation of text or commands.

A problem arises in that Braille representations of Web documents are created by powerful client assistive technologies designed to interact with specific Web browser implementations (e.g., Microsoft Internet Explorer and Netscape Navigator). Such client assistive technologies typically cannot be run on client machines with limited capabilities (e.g., palmtop computers, handheld computers, and personal digital assistants or PDAs). Additionally, assistive technologies typically do not provide access to many complex Web documents such as portable document format (PDF) files.

It would thus be desirable to have a transcoding system for delivering electronic documents such as Web pages, expressed in a variety of digital formats, to a client device having a Braille display and resource limitations which would otherwise preclude such document delivery.

SUMMARY OF THE INVENTION

An electronic document delivery system is described including a client machine coupled to (i.e., in wired or wireless communication with) a transcoder proxy. The client machine may be, for example, a palmtop or handheld computer or a wireless communication device with limited memory and/or processing capability. The client machine includes a Braille display and provides Braille format information identifying a selected Braille format to the transcoder proxy. The Braille display may be the output device of choice for a visually challenged user (e.g., a user with a permanent or temporary visual impairment). The transcoder proxy is coupled to receive electronic documents and the Braille format information. Each electronic document includes presentation information (e.g., text and/or user controls such as buttons) and is expressed in a first digital format. Well known digital formats include text-based markup language formats such as hypertext markup language (HTML) and extensible markup language (XML). Other common digital formats include POSTSCRIPT (™ Adobe Sys. Inc., San Jose, Calif.), portable document format (PDF), and advanced function printing (AFP).

The transcoder proxy includes a rule set including rules for translating electronic documents from any one of the first digital formats listed above to any one of various Braille formats (e.g., English Braille, European Braille, Japanese Braille, and/or grades such as grade 1, grade 2, etc.). The transcoder proxy translates the electronic document from the first digital format to a second digital format (e.g., a scripting language) such that the presentation information is converted to the selected Braille format, and provides the electronic document to the client machine in the second digital format.

One embodiment of the transcoder proxy includes the rule set described above. The transcoder proxy receives Braille format information identifying a selected Braille format (e.g., from the client machine). The transcoder proxy also receives an electronic document in a first digital format and including presentation information. The transcoder proxy selects rules within the rule set dependent upon the Braille format information and the first digital format. The transcoder proxy uses the selected rules to translate the electronic document from the first digital format to the second digital format such that the presentation information is converted to the selected Braille format, and provides the electronic document in the second digital format (e.g., to the client machine).

One embodiment of the client machine includes a user agent coupled to the Braille display. The user agent is adapted for coupling to a transcoder proxy. The user agent provides Braille format information to the transcoder proxy identifying a selected Braille format. The user agent receives an electronic document in a digital format (e.g., the second digital format), wherein the electronic document includes presentation information, and wherein the presentation information is converted to the selected Braille format. The user agent forms a model representing a logical structure of the electronic document. The model may also define methods for accessing and manipulating the document. The model may be, for example, a document object model (DOM). The user agent uses the model to produce output commands, and provide the output commands to the Braille display. As a result, the electronic document is presented to the user via the Braille display.

The client machine may include an assistive technology coupled between the Braille display and the user agent. The assistive technology may provide the Braille format information to the user agent identifying the selected Braille format. The assistive technology may also receive the output commands from the user agent, use the output commands to produce Braille display commands, and provide the Braille display commands to the Braille display.

A method for presenting an electronic document to a user, which may be embodied within the transcoder proxy, includes receiving Braille format information identifying a selected Braille format. An electronic document is received in a first digital format, wherein the electronic document includes presentation information. Rules within the above described rule set are selected dependent upon the Braille format information and the first digital format. The selected rules are used to translate the electronic document from the first digital format to the second digital format such that the presentation information is converted to the selected Braille format. The electronic document is provided (e.g., to a client machine) in the second digital format.

A second method for presenting an electronic document to a user, which may be embodied within the client machine, includes providing Braille format information identifying a selected Braille format. An electronic document is received in a digital format (e.g., the second digital format), wherein the electronic document includes presentation information. The presentation information is converted to the selected Braille format. A model (e.g., a DOM) representing a logical structure of the electronic document is formed, and the model is used to produce output commands. The output commands are provided to a Braille display.

BRIEF DESCRIPTION OF THE DRAWINGS

Other objects and advantages of the invention will become apparent upon reading the following detailed description and upon reference to the accompanying drawings in which.

Figure 1:
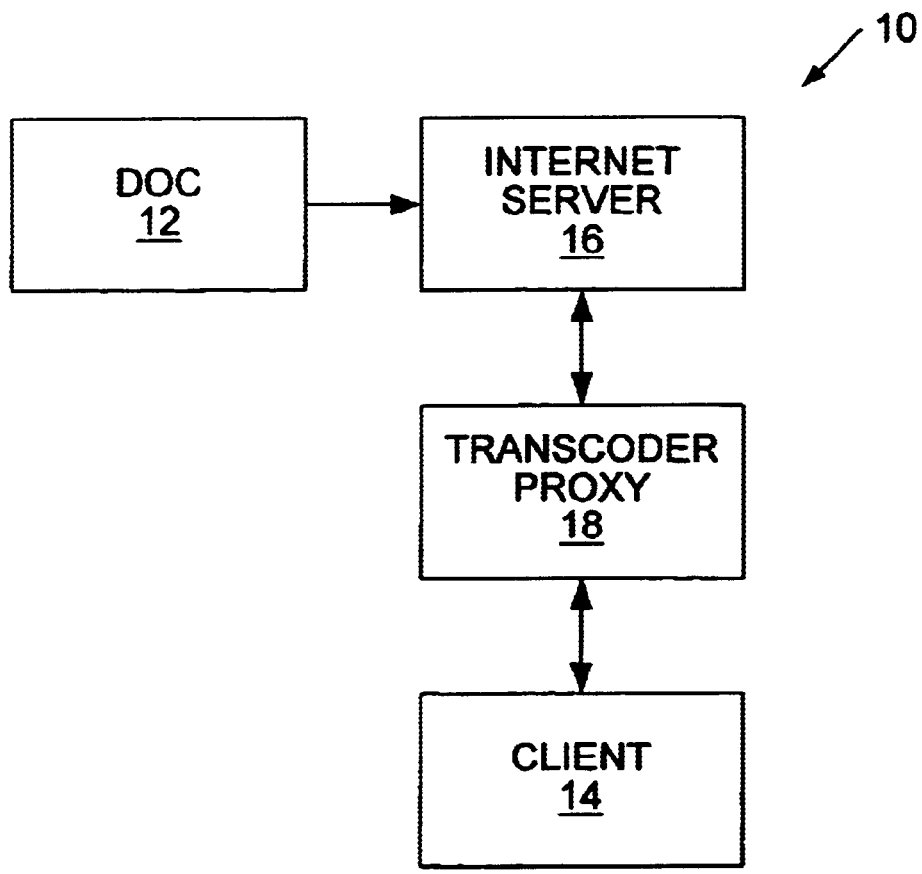
FIG. 1 is a block diagram of a representative system currently used to provide an electronic document (e.g., a Web page) to a client machine with limited capabilities.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

BRIEF DESCRIPTION OF THE DRAWINGS

Figure 2:
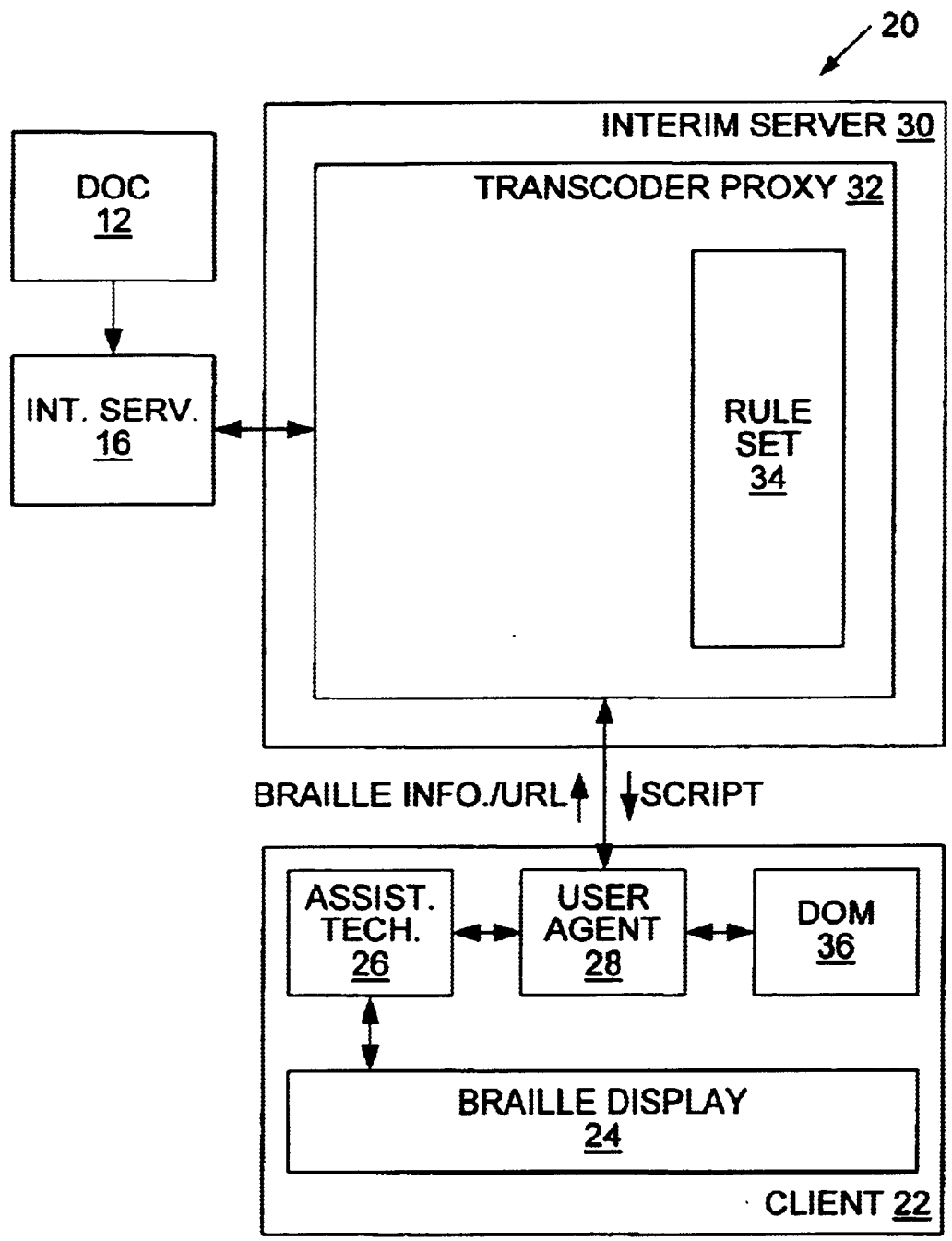
FIG. 2 is a block diagram of one embodiment of a system for providing the electronic document of FIG. 1 to a client machine.

FIG. 2 is a block diagram of one embodiment of a system 20 for providing electronic document 12 (e.g., a Web page) to a client machine 22. Client machine 22 may be, for example, a palmtop computer, a handheld computer, a personal digital assistant (PDA), or a wireless communication device. In the embodiment of FIG. 2, client machine 22 includes a refreshable Braille display 24. Common Braille displays include a linear array of output cells (e.g., 40, 66, or 80 cells). Each cell has either six pins, arranged two pins wide by three pins high, or eight pins arranged two pins wide by four pins high. Pins of a given cell are raised such that they extend from vertical holes to form patterns representing, for example, letters, numbers, punctuation, and/or Braille composition signs. Common Braille displays also include keys or buttons for user input which allow a user to navigate through an electronic document (e.g., a Web document).

Client machine 22 also includes an assistive technology 26 coupled to Braille display 24 and a user agent 28. During system initialization, assistive technology 26 may provide stored information pertaining to a pre-selected (i.e., default) Braille format (e.g., English Braille, European Braille, Japanese Braille, and/or a grade such as grade 1 or grade 2) to user agent 28. Alternately, the user may select a preferred Braille format (e.g., via the keys or buttons of Braille device 24) during system initialization, and assistive technology 26 may provide Braille format information identifying the user-selected Braille format to user agent 28. During system use, the user may change a previously selected Braille format (e.g., via the keys or buttons of Braille device 24). Assistive technology 26 may also provide the number of output cells of Braille display 24 (i.e., the cell count of Braille display 24) and/or the number of pins per output cell (i.e., the pin count of Braille display 24) to user agent 28. User agent 28 provides the Braille format information and/or the Braille display information to transcoder proxy 32.

During system use, user agent 28 provides the uniform resource locator (URL) of document 12 specifying the internet protocol (IP) address of document 12 and the name of the file containing document 12 as indicated by the user via Braille display 24. In the embodiment of FIG. 2, system 20 includes internet server 16 and an interim server 30 coupled between client machine 22 and internet server 16. Interim server 30 includes a transcoder proxy 32. Transcoder proxy 32 forwards electronic document requests from client machine 22 to internet server 16.

Transcoder proxy 32 receives electronic documents (e.g., document 12) from internet server 16 in digital format. Well known digital formats include text-based markup language formats such as hypertext markup language (HTML) and extensible markup language (XML). Other common digital formats include POSTSCRIPT, portable document format (PDF), and advanced function printing (AFP). As illustrated in FIG. 1, transcoder proxy 32 includes a rule set 34. Rule set 34 includes rules for translating document 12 from any one of several digital document formats (e.g., HTML, XML, POSTSCRIPT, PDF, etc.) to any one of various Braille formats (e.g., English Braille, European Braille, Japanese Braille, and/or a grade such as grade 1 or grade 2). Document 12 includes "presentation information" including text and/or user controls such as buttons. As will be described in detail below, transcoder proxy 32 selects and uses a subset of the rules within rule set 34 to translate document 12 to a second digital format e.g., a scripting language) such that the presentation information is converted to the elected Braille format.

The scripting language may be, for example, a subset of the digital format in which transcoder proxy 32 receives document 12 from internet server 16 (e.g., a subset of HTML, XML, POSTSCRIPT, or PDF). In producing the script, transcoder proxy 32 may covert graphics images within electronic document 12 from one format to another (e.g., from joint photographic experts group/JPEG format to graphics interchange format/GIF format, from JPEG and GIF formats to scaled vector graphics/SVG format, etc.). The script may also include, for example, audio data files (e.g., wav files) and/or unformatted text.

Electronic document 12 includes one or more elements representing document structures. Examples of document elements include paragraphs, hypertext links, lists, tables, and images. Transcoder proxy 32 uses the Braille format information and/or the Braille display information (i.e., the cell count and/or the pin count), provided by client machine 22 during system initialization and/or during system use, to select rules within rule set 34 in order to translate document 12 from one digital format (e.g., HTML, XML, POSTSCRIPT, PDF, etc.) to a script written in a scripting language understood by user agent 28 within client machine 22. The script includes a description of the elements of document 12. As described above, the presentation information within document 12 is converted to the selected Braille format. Transcoder proxy 32 provides the produced script to user agent 28.

By locating rule set 34 within transcoder proxy 32, the resource requirements of client machine 22 are reduced, allowing electronic documents such as Web pages, expressed in a variety of digital formats, to be delivered to a client machine having a Braille display and resource limitations which would otherwise preclude such document delivery.

In response to the received script, user agent 28 of client machine 22 produces a document object model (DOM) 36. DOM 36 defines a tree-like logical structure of document 12, and also defines methods for accessing and manipulating document 12. As will be described in more detail below, DOM 36 facilitates navigation of the logical structure of electronic document 12. DOM 36 preferably complies with the World Wide Web Consortium (W3C) DOM specification available on the Web at URL http://www.w3.org/. User agent 28 uses DOM 36 to issue output commands to Braille display 24 via assistive technology 26.

User input via one or more keys or buttons of Braille display 24 is passed to user agent 28 via assistive technology 26. User agent 28 accesses one or more elements within DOM 36 according to the user input. Such access may involve user agent 28 navigating the logical structure of electronic document 12 via DOM 36 according to the user input. As a result of the user input, user agent 28 issues new output commands to Braille display 24 via assistive technology 26, and the information presented to the user via Braille display 24 is changed. Assistive technology 26 may receive the output commands from user agent 28, use the output commands to produce Braille display commands, and provide the Braille display commands to Braille display 24.

For example, document 12 may be a form, and a user may activate a key or button of Braille display 24 to input a "tab" character to move from a first field of the form to a second field. User agent 28 may use the "tab" input to access one or more elements within DOM 36. In accordance with DOM 36 and the "tab" input, user agent 28 may issue new output commands to Braille display 24 via assistive technology 26 which cause the line containing the second field to be presented in Braille upon Braille display 24.

Figure 3:
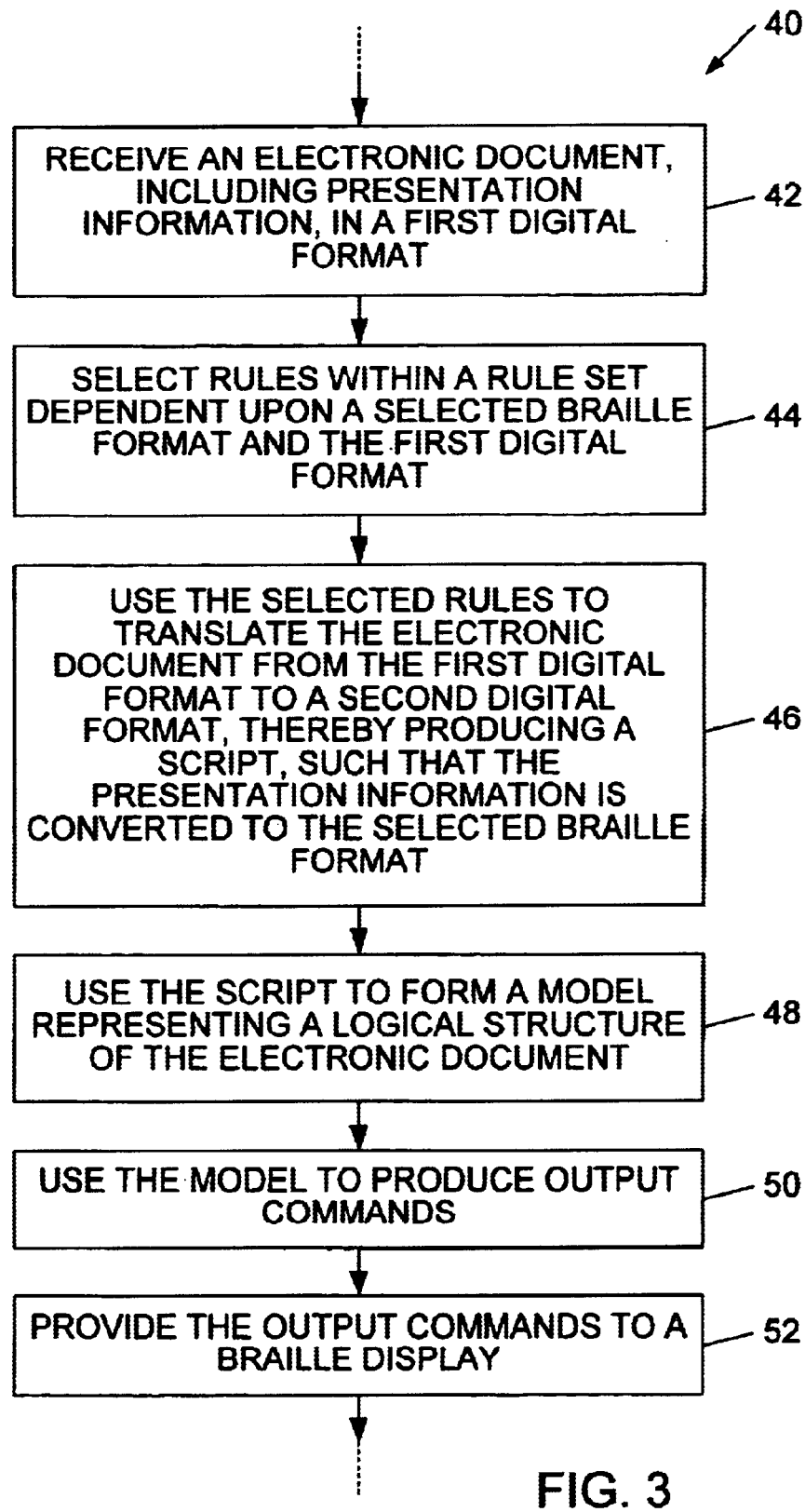
FIG. 3 is a flow chart of one embodiment of a method for presenting an electronic document to a user.

FIG. 3 is a flow chart of one embodiment of a method 40 for presenting an electronic document to a user. During a step 42, the electronic document is received in a first digital format, wherein the electronic document includes presentation information. Rules within a rule set are selected dependent upon a selected Braille format and the first digital format during a step 44. The rule set includes rules for translating the electronic document from any one of several digital formats to any one of various Braille formats. During a step 46, the selected rules are used to translate the electronic document from the first digital format to a second digital format thereby producing a script, wherein the translating is performed such that the presentation information is converted to the selected Braille format. The script is used to form a model representing a logical structure of the electronic document during a step 48. During a step 50, the model is used to produce output commands. The output commands are provided to a Braille display during a step 52.

It is noted that in the embodiment of system 20 in FIG. 2, transcoder proxy 32 may embody steps 42, 44, and 46, and client machine 22 may embody steps 48, 50, and 52. As described above, client machine 22 may provide Braille format information identifying the selected Braille format to transcoder proxy 32, and transcoder proxy 32 may use the Braille format information in order to accomplish step 44.

It will be appreciated by those skilled in the art having the benefit of this disclosure that this invention is believed to be a transcoding system for delivering electronic documents such as Web pages, expressed in a variety of digital formats, to a client device having a Braille display and resource limitations which would otherwise preclude such document delivery. It is intended that the following claims be interpreted to embrace all such modifications and changes and, accordingly, the specification and drawings are to be regarded in an illustrative rather than a restrictive sense.

What is claimed is:

1. A system for delivering an electronic document, comprising:

a client machine comprising a Braille display and configured to provide Braille format information identifying a selected Braille format; and a transcoder proxy coupled to receive the electronic document and the Braille format information, wherein the electronic document is expressed in a first digital format and includes presentation information, and wherein the transcoder proxy comprises a rule set including rules for translating the electronic document from the first digital format to any one of a plurality of Braille formats, and wherein the transcoder proxy is configured to:

translate the electronic document from the first digital format to a second digital format such that the presentation information is converted to the selected Braille format; and provide the electronic document to the client machine in the second digital format.

2. The system as recited in claim 1, wherein the selected Braille format is selected from the group consisting of English Braille, European Braille, and Japanese Braille.

3. The system as recited in claim 1, wherein the first digital format is a text-based markup language.

4. The system as recited in claim 3, wherein the text-based markup language is selected from the group consisting of hypertext markup language (HTML), extensible markup language (XML), POSTSCRIPT, and portable document format (PDF).

5. The system as recited in claim 1, wherein the second digital format is a scripting language.

6. The system as recited in claim 1, wherein the presentation information comprises text and user controls.

7. The system as recited in claim 1, wherein the transcoder proxy resides within a server.

8. The system as recited in claim 1, wherein the client machine is a palmtop computer, a handheld computer, or a wireless communication device.

9. A transcoder proxy, comprising:
   a rule set including rules for translating the electronic document from any one of a plurality of digital formats to any one of a plurality of Braille formats; and
   wherein the transcoder proxy is configured to:
      receive Braille format information identifying a selected Braille format;
      receive an electronic document in a first digital format, wherein the electronic document includes presentation information;
      select rules within the rule set dependent upon the Braille format information and the first digital format;
      use the selected rules to translate the electronic document from the first digital format to a second digital format such that the presentation information is converted to the selected Braille format; and
      provide the electronic document in the second digital format.

10. The transcoder proxy as recited in claim 9, wherein the transcoder proxy resides within a server.

11. A client machine, comprising:
    a Braille display; and
    a user agent coupled to the Braille display and adapted for coupling to a transcoder proxy, wherein the user agent is configured to:
       provide Braille format information to the transcoder proxy identifying a selected Braille format;
       receive an electronic document in a digital format, wherein the electronic document includes presentation information, and wherein the presentation information is converted to the selected Braille format;
       form a model representing a logical structure of the electronic document;
       use the model to produce output commands; and
       provide the output commands to the Braille display.

12. The client machine as recited in claim 11, wherein the model also defines methods for accessing and manipulating the document.

13. The client machine as recited in claim 12, wherein the model is a document object model (DOM).

14. The client machine as recited in claim 11, further comprising an assistive technology coupled between the Braille display and the user agent, wherein the assistive technology is configured to:
    provide the Braille format information to the user agent identifying the selected Braille format;
    receive the output commands from the user agent;
    use the output commands to produce Braille display commands; and
    provide the Braille display commands to the Braille display.

15. The client machine as recited in claim 11, wherein the client machine is a palmtop computer, a handheld computer, or a wireless communication device.

16. A method for presenting an electronic document to a user, comprising:
    receiving Braille format information identifying a selected Braille format;
    receiving the electronic document in a first digital format, wherein the electronic document includes presentation information;
    selecting rules within a rule set dependent upon the Braille format information and the first digital format, wherein the rule set includes rules for translating the electronic document from any one of a plurality of digital formats to any one of a plurality of Braille formats;
    using the selected rules to translate the electronic document from the first digital format to a second digital format such that the presentation information is converted to the selected Braille format; and
    providing the electronic document in the second digital format.

17. A method for presenting an electronic document to a user, comprising:
    providing Braille format information identifying a selected Braille format;
    receiving an electronic document in a digital format, wherein the electronic document includes presentation information, and wherein the presentation information is converted to the selected Braille format;
    forming a model representing a logical structure of the electronic document;
    using the model to produce output commands; and
    providing the output commands to a Braille display.

18. A method for presenting an electronic document to a user, comprising:
    receiving the electronic document in a first digital format, wherein the electronic document includes presentation information;
    selecting rules within a rule set dependent upon a selected Braille format and the first digital format, wherein the rule set includes rules for translating the electronic document from any one of a plurality of digital formats to any one of a plurality of Braille formats;
    using the selected rules to translate the electronic document from the first digital format to a second digital format thereby producing a script, wherein the translating is performed such that the presentation information is converted to the selected Braille format;
    using the script to form a model representing a logical structure of the electronic document;
    using the model to produce output commands; and
    providing the output commands to a Braille display.

* * * * *